United States Patent [19]
Stevens

[11] 3,778,046
[45] Dec. 11, 1973

[54] JET ENGINE POWERED BLOWER FOR SUPPLYING COMBUSTION BLAST GAS AND REDUCING GAS TO A BLAST FURNACE

[75] Inventor: John H. Stevens, Peters Township, Washington County, Pa.

[73] Assignee: United States Steel Corporation, Pittsburgh, Pa.

[22] Filed: Sept. 11, 1972

[21] Appl. No.: 287,937

[52] U.S. Cl. .................................. 266/29, 266/25
[51] Int. Cl. ........................................... F27b 11/10
[58] Field of Search ................... 75/41, 42; 266/13, 266/25, 28, 29, 30

[56] References Cited
UNITED STATES PATENTS
3,216,711   11/1965   Diotalevi et al. .................... 266/13
3,216,712   11/1965   Dunkak .............................. 266/13

*Primary Examiner*—Gerald A. Dost
*Attorney*—Donald S. Ferito

[57] ABSTRACT

An aircraft-type jet engine is utilized as the source of gases for driving a free turbine which in turn drives a compressor to raise combustion blast gas pressure and reducing gas pressure to that required for blast furnace operation.

3 Claims, 1 Drawing Figure

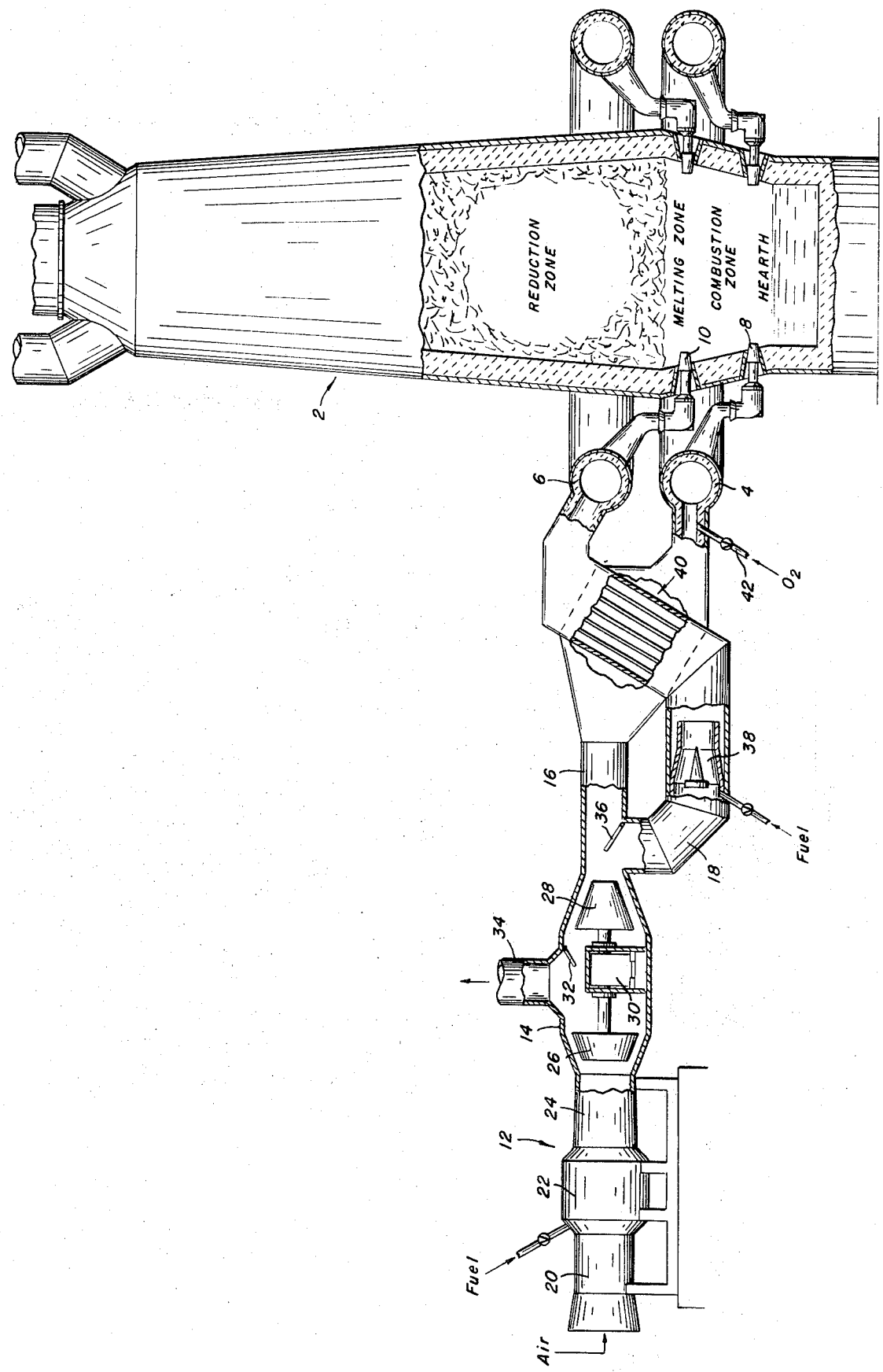

JET ENGINE POWERED BLOWER FOR SUPPLYING COMBUSTION BLAST GAS AND REDUCING GAS TO A BLAST FURNACE

The present invention relates generally to blast furnaces and more particularly to improved apparatus for supplying combustion blast gas and reducing gas to a blast furnace.

One of the problems inherent in the blast furnace process of producing iron arises from the dual function of the blast furnace, i.e., reduction and melting. The gas leaving the melting zone and entering the reduction zone must having a temperature higher than the melting point of iron, which is approximately 2800°F. At the same time the maximum temperature in the reduction zone should be lower than the melting point of iron oxide which is approximately 2580°F.

It is, accordingly, the primary object of my invention to provide improved apparatus for supplying gas at the proper temperature and pressure for combustion of carbon within a blast furnace and for supplying reducing gas at the proper temperature and pressure to assist in the reduction of iron oxides within a blast furnace.

It is a more specific object of my invention to provide apparatus as set forth in the above-stated object wherein an aircraft-type jet engine is utilized as the source of blast furnace compression and reducing gases for a blast furnace which gases also power a free turbine which in turn drives a compressor to raise the combustion gas pressure and reducing gas pressure to that required for the furnace. The apparatus also includes an after-burner and heat exchanger to control the temperatures of the combustion blast gas and reducing gas supplied to the blast furnace.

The most pertinent references of which I am aware are U. S. Pat. No. 3,216,711 and No. 3,216,712, both dated Nov. 9, 1965.

The above and other objects will become more apparent after referring to the following specification and attached drawing, in which:

The single FIGURE of the drawing is an elevational view of a blast furnace partly in section provided with the apparatus of the invention.

The present invention contemplates providing heated and pressurized gas to the combustion zone of a blast furnace by means of tuyeres attached to one of two bustle pipes encircling the furnace. The high sensible heat of the incoming gas plus the reaction of $O_2$ with carbon in the furnace will generate the required temperature. The apparatus of the invention also provides heated and pressurized gases in the form of $CO_2$, $H_2O$ and $N_2$ to an area above the combustion zone of the furnace by means of tuyeres attached to the second bustle pipe encircling the furnace. $CO_2$ and $H_2O$ upon entering the furnace will react with carbon in the furnace to form CO and $H_2$. These reactions are endothermic and as such will absorb a large amount of sensible heat from the combustion gases. CO and $H_2$ formed by this reaction are the necessary reducing gases required in the blast furnace process of reducing iron oxides to iron. The apparatus of the invention succeeds in setting the proper temperatures in the proper places of the blast furnace and generates additional reducing gases while doing so, thereby greatly increases the operating efficiency of the blast furnace process.

Referring more particularly to the drawing, reference character 2 designates generally a blast furnace having the apparatus of the invention incorporated therewith. The apparatus of the invention includes a first bustle pipe 4 encircling the lower portion of the furnace and a second bustle pipe 6 encircling the furnace spaced above the first bustle pipe 4. Bustle pipe 4 is adapted to receive heated and pressurized combustion blast gas and delivery it to the furnace through tuyeres 8 which are connected with the bustle pipe 4 and lead into the combustion zone of the furnace. Bustle pipe 6 is adapted to receive heated and pressurized reducing gas and deliver it to the furnace by means of tuyeres 10 which are connected with bustle pipe 6 and lead to the interior of the furnace just below its reduction zone.

A gas turbine engine in the form of a jet-type aircraft engine, designated generally by reference numeral 12, is connected with the bustle pipes 4 and 6 by means of a duct 14 having one passageway 16 connected with bustle pipe 4 and another passageway 18 connected with bustle pipe 6.

The jet engine 12 includes a compressor 20, combustion chambers 22, and a turbine 24. The entry end of duct 14 is connected with the exhaust end of the turbine 24.

In normal operation, air is drawn into compressor 20, compressed therein and then directed to combustion chambers 22, wherein fuel is burned and the gases resulting therefrom are exhausted to turbine 24. The hot exhaust gases issuing from the turbine 24 into duct 14 are directed onto a free turbine 26 which is disposed in the entry end of the duct. The free turbine 26 drives a compressor 28 by means of a gear reducer 30. A control valve 32 in duct 14 diverts parts of the exhaust gas issuing from the turbine 24 to vent through a stack 34 to a waste heat boiler (not shown). The remainder of the gas issuing from turbine 24 is diverted to compressor 28 by valve 32.

Compressor 28 compressed that part of the exhaust gas diverted thereto and directs it by means of a control valve 36 partially to passageway 16 and partially to passageway 18.

Bustle pipe 4 receives hot combustion gas from the compressor 28 through the passageway 16 while bustle pipe 6 receives reducing gas from the compressor 28 through the passageway 18. The combustion gas is introduced by the tuyeres 8 into the combustion zone of the furnace. The temperature of the gas delivered into passageway 16 from compressor 28 is raised by passage through a heat exchanger 40 before it enters the bustle pipe 4, as will be more fully explained hereinafter. The gas entering the bustle pipe 4 is made up of $O_2$, $CO_2$, $H_2O$, and $N_2$ and serves as the combustion blast gas for the furnace 2.

An afterburner 38 is disposed in the passageway 18 between the compressor 28 and the heat exchanger 40 which heat exchanger is located in the duct 14 in the path of gases passing through both of the passageways 16 and 18. Sufficient fuel, which may be natural gas or fuel oil, is burned in the afterburner 38 to eliminate all excess $O_2$ from the gases passing through passageway 18. After the exhaust gas has passed through the afterburner, its components are $CO_2$, $H_2O$, and $N_2$, and its temperature is approximately 4000°F. This superheated reducing gas is directed through the heat exchanger 40 into bustle pipe 6 from whence it is directed into the interior of the furnace 2, above the combustion zone just below the reduction zone, by means of tuyeres 10. The heat exchanger 40 transfers heat from the superheated gas in passageway 18 to the compressed combustion blast gas in the passageway 16. Thus, the sensible heat of the combustion blast gas is raised while the sensible heat of the reducing gas is lowered.

Additional amounts of $O_2$ may be injected through an inlet 42 attached to the duct 14 leading to passageway 16 just before its connection with bustle pipe 4 to increase the flame temperature in the combustion zone in the furnace.

While I have shown but one embodiment of my invention, other adaptations and modifications may be made without departing from the scope of the following claims.

I claim:

1. In a blast furnace having a combustion zone and a reduction zone above said combustion zone the improvement therewith of apparatus for generating and delivering heated and pressurized combustion blast gas and reducing gas to said blast furnace, said apparatus comprising a first bustle pipe encircling said furnace and having an inlet for receiving combustion blast gas under pressure, tuyeres leading from said first bustle pipe to the interior of said combustion zone, a second bustle pipe encircling said furnace and having an inlet for receiving reducing gas under pressure, tuyeres leading from said second bustle pipe to the interior of said furnace immediately below the reduction zone thereof, a gas turbine engine including a compressor, combustion chamber, and a turbine arranged in tandem, and an exhaust duct leading from the discharge end of said turbine, said duct having a first passageway leading to and connected with said inlet in said first bustle pipe and a second passageway leading to and connected with the inlet in said second bustle pipe, a free turbine in the entry end of said duct in the path of exhaust gas issuing from the turbine of said engine, a compressor in said duct spaced from said free turbine, driving means connected and powered with said free turbine, said compressor being connected with said driving means whereby said compressor is driven by said free turbine, a control valve in said duct adjacent the exhaust end of said compressor in said duct for diverting gas from said compressor partially into said first passageway and partially into said second passageway, an afterburner in said second passageway for raising the temperature of gas passing therethrough to a temperature above that required to maintain a reduction reaction in said furnace, a heat exchanger in said duct in the pathway of gases traveling through said passageways prior to their introduction into said inlets whereby the temperature of the gas passing through said passageway from said afterburner to said second bustle pipe is reduced and the temperature of the gas passing through said first passageway to said first bustle pipe is raised.

2. Apparatus as defined in claim 1 including a control valve in the entry end of said duct, and a vent stack in the entry end of said duct, said control valve being adapted to divert gas entering said duct from the turbine of said engine partially into said vent stack.

3. Apparatus as defined by claim 1 including an inlet tube in said first passageway disposed between said heat exchanger and said first bustle pipe for introducing supplemental oxidizing gas into the gas flowing into said first bustle pipe from said first passageway to raise the temperature in the combustion zone of said furnace.

* * * * *

UNITED STATES PATENT OFFICE
CERTIFICATE OF CORRECTION

Patent No. 3,778,046                Dated December 11, 1973

Inventor(s) John H. Stevens

It is certified that error appears in the above-identified patent and that said Letters Patent are hereby corrected as shown below:

Column 2, line 6, "delivery" should read -- deliver --;

line 36, "compressed" should read -- compresses --

Column 4, line 17, Claim 1, before "passageway" insert -- second --.

Signed and sealed this 30th day of April 1974.

(SEAL)
Attest:

EDWARD M. FLETCHER, JR.
Attesting Officer

C. MARSHALL DANN
Commissioner of Patents